United States Patent [19]

Bodewes et al.

[11] 4,318,468

[45] Mar. 9, 1982

[54] CONVEYOR DEVICE

[75] Inventors: Hermanus J. A. Bodewes, Uden; Jacobus M. van den Goor, Eindhoven, both of Netherlands

[73] Assignee: Lear Siegler, Inc., Grand Rapids, Mich.

[21] Appl. No.: 128,802

[22] Filed: Mar. 10, 1980

[30] Foreign Application Priority Data

May 11, 1979 [NL] Netherlands ..................... 7903711

[51] Int. Cl.³ .............................................. B65G 35/00
[52] U.S. Cl. .................................... 198/718; 198/721; 198/725
[58] Field of Search ............... 198/721, 718, 725, 781, 198/783, 790, 789

[56] References Cited

U.S. PATENT DOCUMENTS 3,156,345  11/1964  De Good ........................ 198/781
3,164,246  1/1965   De Good ........................ 198/781
3,420,356  1/1969   De Good ........................ 198/781
3,650,376  3/1972   Burgis et al. ................... 198/721

Primary Examiner—Joseph E. Valenza
Attorney, Agent, or Firm—Price, Heneveld, Huizenga & Cooper

[57] ABSTRACT

An accumulator conveyor has rollers forming an object transport surface and an endless flexible drive member. The drive member, at intervals, rests on and travels over support members each resiliently supported for vertical movement. Each support member has a generally circular drive member support having a flattened area of reduced radius and also a circular feeler extending into the path of objects on the transport surface. An object held stationary over the feeler depresses it and the drive member, with the drive member continuing to rotate until the flattened area is uppermost, dropping the drive member and terminating its drive engagement with the object above.

4 Claims, 5 Drawing Figures

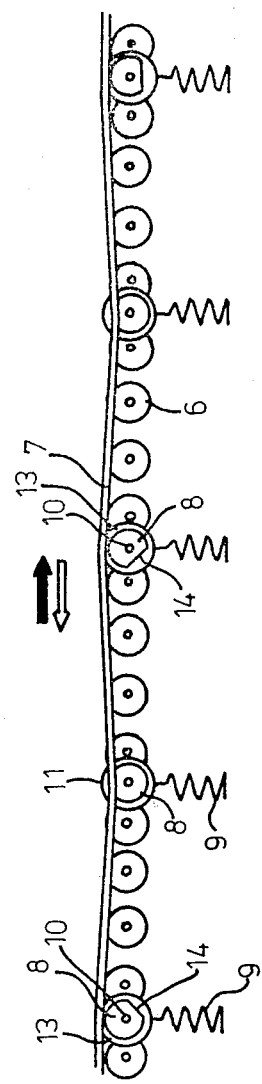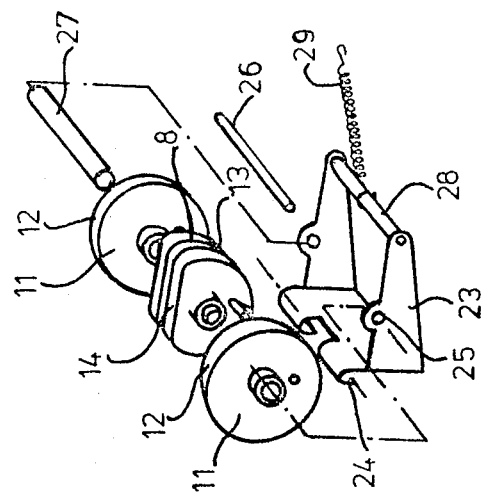

CONVEYOR DEVICE

The invention relates to a conveyor device provided with a frame and a flexible drive device which can more continuously during operation which is essentially parallel with the surface over which the objects to be transported are moving, and which interacts with regulating devices capable of rotation around axes of rotation, for the direct or indirect transmission of the drive force from the driving device to the objects to be moved, whereby a regulating device which is rotatable around one axis of rotation comprises one portion which extends concentrically around the axis of rotation and a circumferential section, connected therewith, which possesses a circumference which extends around the corresponding axis of rotation in such a way that in the event of rotation of the corresponding regulating device the portion of the drive device which is located adjacent to a rotable regulating device and which is transverse to the axis of rotation of the rotable regulating device can move to and fro between a position in which the drive device can exert a drive force on the object, and a position in which the drive device exerts no driving force on the objects, and where a feeler which can project at least partially above the flexible drive device in the event of no load on the regulating device is connected with the regulating device.

If at a certain point on the conveyor device an object which is being transported by the conveyor device comes to a standstill, when employing such a conveyor device the regulating devices located in the vicinity of the object come to a standstill in such a position that the flexible drive device exerts hardly any further driving force on the corresponding object. A known device of this type has behaved well, but in some cases difficulties have arisen because, with objects such as for example boxes where the base is not flat, the intended action has not been achieved in an optimum manner.

The present invention aims to provide a device of the abovementioned type whereby the possible occurrence of such shortcomings can be overcome in a simple manner.

In accordance with the invention this can be achieved by arranging the rotable regulating device resiliently in the frame so that it can deflect transversely in respect of the longitudinal direction of the flexible drive device.

By employing the design in accordance with the invention, it is possible to ensure in a simple manner a match with the nature of the base surface of the objects to be moved, whereby the function required from the device will always be achieved.

The invention will be discussed in greater detail in the following with the aid of several embodiments of the design in accordance with the invention which are shown schematically in the appended diagrams.

FIG. 1 shows schematically a sideview of a part of a conveyor device in accordance with the invention.

FIG. 2 shows one a larger scale in perspective, with the components spaced apart, a regulating device with a supporting device for this regulating device.

FIG. 4 shows the components spaced apart from each other for a second possible embodiment with resilient suspension of a regulating device.

Figure 3:
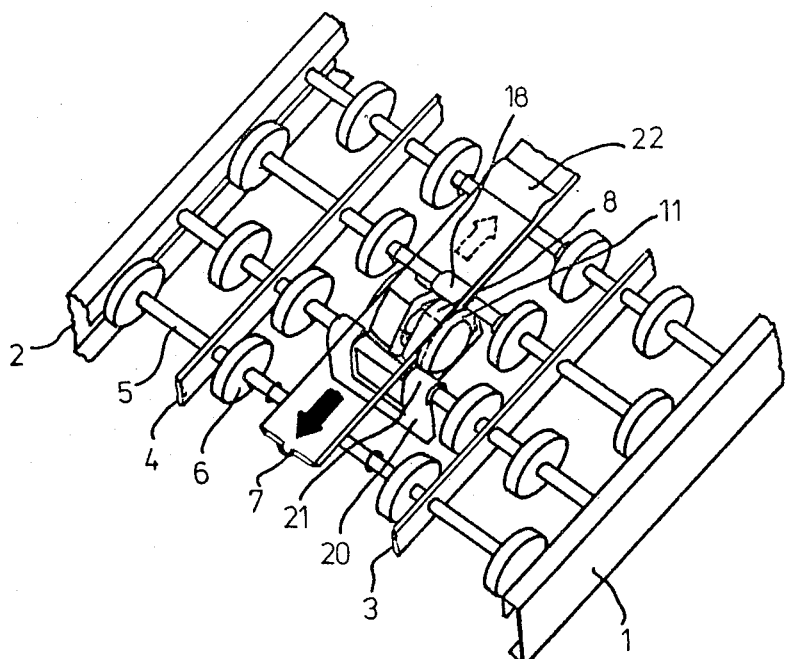
FIG. 3 shows in perspective a top view of a part of the device shown in FIG. 1, whereby in order to reproduce the components located underneath the flexible drive belt, it has been assumed that the flexible drive belt is transparent.

The conveyor device shown in FIG. 1-3 comprises a frame which is provided with two frame beams 1 and 2 which extend parallel with each other, between which supporting beams 3 and 4 which are parallel with the frame beams 1 and 2 are provided. In the frame beams 1 and 2 and the supporting beams 3 and 4 a large number of shafts 5 which are parallel with each other are provided, on which supporting rollers 6 are mounted.

In the embodiment shown roughly between the frame beams 1 and 2 which extend in the lengthwise direction of the conveyor device an endless belt 7 which forms a flexible drive device is incorporated, of which only the top part extending above the shafts 5 is shown in the diagrams. With the aid of drive devices which are not shown in greater detail the endless belt 7 can be driven in a known manner so that the top part of the belt moves in one or other direction, as indicated by arrows in the diagrams.

At regular intervals from each other underneath the top section of the belt 7 regulating devices 8 are provided which, as shown schematically in FIG. 1, are supported by means of a resilient mechanism 9, so that these regulating devices 8 can deflect resiliently in a direction which is approximately vertical to the lengthwise direction of the top section of the endless belt 7. Here the regulating devices 8 can rotate around axes of rotation 10 which extend parallel with the centre lines of the shafts 5.

One embodiment of a regulating device and a supporting device for the corresponding regulating device is shown in perspective in greater detail in FIG. 2. As can be seen from this FIG. 2, a regulating device 8 forms an entity with two disc shaped sections 11 which form feelers located at a distance from and parallel with each other, the external circumferences 12 of which extend concentrically around the axis of rotation 10 of the corresponding regulating device. Between the two discs 11 two discs are provided forming the actual regulating device 8, which discs-forming adjusting sections for the belt-are so shaped that an initial portion 13 of the external circumference of one adjusting section similarly extends concentrically around the axis of rotation 10, whilst a further portion 14 of the external circumference of this adjusting section in the embodiment shown is so designed that this portion 14 of the external circumference of the adjusting section is located at a shorter distance from the axis of rotation 10 than the portion 13 of the external circumference of the adjusting section. Between the two adjusting sections a pin is provided, not visible in the diagram, the external circumference of which similarly extends concentrically in respect of the axis of rotation 10.

With the aid of this pin on the regulating device 8 the regulating device can be rotably mounted in a supporting device 16, made preferably from plastic, in one piece, which forms a bearing shell 15. The bearing shell 15 is fastened to the end of an arm 17, which connects to the end of one leg of a U-shaped section 18 of the supporting device 16. The other leg of the U-shaped section 18 is longer than the leg to which the arm 17 is connected and to the free end of this second leg an arm 19 is connected, which extends parallel with and below the arm 17. To the end of the arm 19 which faces away from the U-shaped section 18 a plate 20 is attached which extends transversely in respect of the arm 19 and to whose ends hooks 21 are attached.

As shown in FIG. 3 the regulating device can be supported in the bearing shell 15 and with the aid of the supporting device can be connected to two shafts 5 mounted in the frame which extend parallel with each other in such a way that one of the shafts 5 lies between the arms of the shackle 18, whilst the hooks 21 engage with the other shaft 5. Since the supporting device 16 is made flexible, this hooking on of the supporting device to the corresponding shafts 5 can be executed without difficulty.

The design is such that in the unloaded state the resilient supporting device has a tendency to press the regulating device 8 upwards in such a way that the disc-shaped portions 2 are located on either side next to the top section of the endless belt 7. During normal operation the objects to be moved are displaced in the direction in which the top part of the belt 7 is driven over the rollers 6 in that they are entrained by the belt 7. For this purpose the belt 7 is pressed against the underside of the objects with the aid of sections 13 of the adjusting sections of the regulating devices, which press against the lower face of the top part of the belt 7.

As already pointed out above, these sections 13 extend only over a portion of the circumference of the adjusting sections concentrically around the axes of rotation 10, whilst the circumferential sections 14 of these adjusting sections are located closer to the axis of rotation. Hence these sections 14 are not able to press the top section of the belt 7 against the objects, but during normal operation this will not interfere with smooth movement of the objects, because as a result of the inertia of the moving parts rotation of the regulating devices 8 is ensured and consequently the top part of the belt 7 is pressed, although intermittently, against the objects to be moved. Thanks to the resilient arrangement of the regulating devices 8, these regulating devices 8 and the section of the belt 7 which is supported by the corresponding regulating device can adapt themselves more easily to any irregularities in the base surfaces of the objects to be moved which rest on the top part of the belt 7, so that even objects possessing such irregular bottom surfaces can still be moved in the desired fashion.

If for some reason an object resting on the top part of the belt 7 should be held back, the regulating devices 8 which are located at the same height as this object, will as a result of the continuously moving belt 7 continue to rotate into a position in which the confining sections 14 of the circumference of the adjusting sections extend approximately parallel with the top part of the belt 7. During this, as the result of the object and with the aid of the feelers 12, the regulating device is pressed downwards and the driven belt is then free from the corresponding regulating device 8. The regulating device 8 which is in contact with the stationary object will be held fixed in this position, so that the moving belt 7 can move freely between the object and the regulating device.

In order to impart rotation once again to a regulating device which has been brought to a standstill, at the moment in time when the cause of the stoppage of the corresponding object has been remedied, the endless belt 7 can be provided locally at one or several points with a thickened portion 22 as indicated in FIG. 3. If the thickened point, at the location of a stationary regulating device 8, comes into contact with an object the corresponding portion of the belt will be to some extent pressed downwards and will thus come into contact with the roller and by this means will once more be made to move. There are also other feasible solutions for imparting renewed rotation to a regulating device which has been brought to a standstill. For example the conveyor device can be arranged so that it slopes slightly, so that an object which is no longer held back, starts to move under the influence of gravity and hence—as a result of its contact with the round feelers 12, the regulating devices are again made to rotate. It is also possible for a separate mechanism to be employed for imparting renewed movement to objects which have been brought to a standstill.

FIG. 4 illustrates a second embodiment of a resilient support for the regulating device 8 which is connected with feelers 12 and built up from adjusting components 13, 14 located inbetween.

A U-shaped supporting device 23, which is provided with two hooks 24 on the two legs of the intermediate piece combining the U-shaped supporting device, is provided for supporting the regulating device 8. In the legs of the intermediate piece which extend parallel with each other holes 25 are provided for accommodating a shaft 26, over which a bush 27 which carries the discs 12 and the regulating devices 13, 14 can be pushed in such a way that the regulating device 8 will be rotably arranged between the arms of the shackle 23. The end of the legs of the shackle 23 which face away from the centre section are mutually connected by a bar 28, to which the end of a draw spring 29 is connected.

The supporting device shown in FIG. 4 can now, with the aid of the hook-shaped component, be hung on one of the shafts 5 so that the regulating device 8 will, in a manner as described for the embodiment mentioned above, come to rest under the top portion of the belt 7. The end of the spring 29 facing away from the bar 28 can be hooked onto a further shaft, so that the spring tends to press the regulating device 8 upwards in a manner similar to that described above, whilst the regulating device 8 can be swivelled downwards against the preloading of the spring 29. The subsequent functioning of the device will be identical with that of the first embodiment described.

With the embodiments described above the top part of the conveyor belt during operation makes direct contact with the object to be moved.

Figure 5:
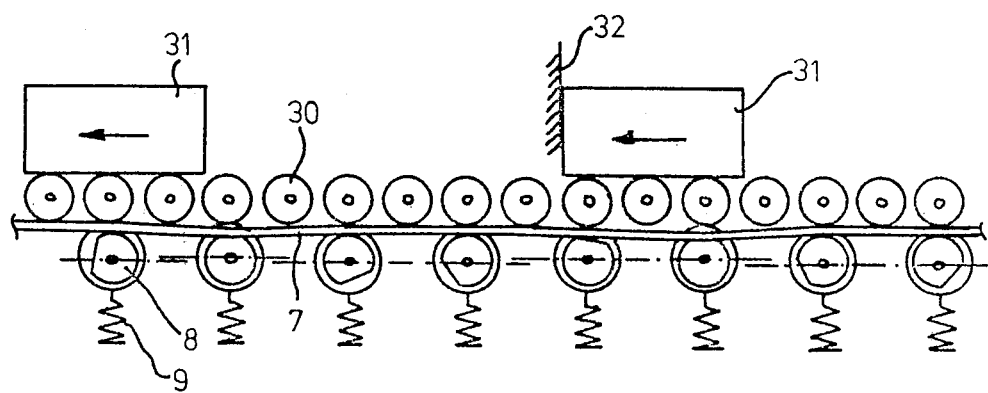
FIG. 5 shows schematically a side view of a second embodiment of a device in accordance with the invention.

However as shown in FIG. 5 the objects can also be driven indirectly via the belt 7. In FIG. 5 the components which correspond with the components shown in FIG. 1–4 are provided with the same notation numbers as in FIG. 1–4.

As shown in FIG. 5 the top part of the belt 7 interacts together with the rollers 30 arranged above the belt, on which rollers the objects 31 to be moved will rest. It will be clear that if with this embodiment on object, as shown by the right-hand object in FIG. 5, is held back by a stop 32 or the like, contact will be lost between the top part of the belt 7 and the rollers which support this object, so that the rollers which support the stationary object are no longer driven by the moving belt. Also by virtue of the fact that the rotable regulating devices 8 are resiliently mounted, it is easy for tolerances, e.g. in the diameter of the rollers or in the assembly of the rollers in the frame to be allowed for, so that at all times the effect required from the design in accordance with the invention will be achieved.

We claim:

1. An accumulator conveyor having a conveying surface and a driven endless flexible drive device extending lengthwise thereof, a regulating and support member beneath said flexible device, said member being supported for vertical movement and means resiliently biasing it upwardly; a support element and a circular feeler, said support member having a shaft rotatably mounting said support element beneath said flexible drive and said circular feeler offset laterally to one side of said flexible device, said support element being normally biased into supporting contact with said flexible element and having a chord-like portion of reduced radius forming a flattened rest; said circular feeler member having a diameter such that it projects into the path of objects on said conveying surface whereby an object becoming stationary above said support member will both depress said feeler and restrict rotation thereof until the flattened rest of said support element is directed upwardly, lowering said drive device sufficiently to disengage its drive connection to the object resting on said feeler.

2. The accumulator conveyor described in claim 1 wherein said flexible device is a belt.

3. The accumulator conveyor described in claim 2 wherein a pair of said feelers are provided, one on each side of said belt.

4. The accumulator conveyor described in either claim 2 or 3 wherein said support member is a bracket elongated lengthwise of said conveyor, means supporting said bracket at both ends, said bracket being of plastic material capable of resilient deflection for shifting the vertical position of said feelers.

* * * * *